United States Patent
Ochiai et al.

(10) Patent No.: US 10,082,407 B2
(45) Date of Patent: Sep. 25, 2018

(54) ANGLE DETECTING APPARATUS AND ANGLE DETECTING SYSTEM

(71) Applicants: MINEBEA MITSUMI INC., Kitasaku-gun, Nagano (JP); KYUSHU UNIVERSITY, NATIONAL UNIVERSITY CORPORATION, Fukuoka-shi, Fukuoka (JP)

(72) Inventors: Takaaki Ochiai, Yachimata (JP); Takuji Yamada, Yaizu (JP); Ichiro Sasada, Fukuoka (JP); Takuya Matsuda, Fukuoka (JP); Jisho Oshino, Fukuoka (JP)

(73) Assignee: MINEBEA MITSUMI INC., Nagano (JP)

(*) Notice: Subject to any disclaimer, the term of this patent is extended or adjusted under 35 U.S.C. 154(b) by 0 days.

(21) Appl. No.: 15/378,599

(22) Filed: Dec. 14, 2016

(65) Prior Publication Data
US 2017/0167895 A1   Jun. 15, 2017

(30) Foreign Application Priority Data
Dec. 14, 2015   (JP) .................. 2015-243553

(51) Int. Cl.
*G01B 7/30* (2006.01)
*G01D 5/20* (2006.01)

(52) U.S. Cl.
CPC ......... *G01D 5/2033* (2013.01); *G01D 5/2046* (2013.01); *G01B 7/30* (2013.01)

(58) Field of Classification Search
CPC ................. G01B 7/30; G01D 5/2013
USPC ........................ 324/207.17, 207.25
See application file for complete search history.

(56) References Cited

U.S. PATENT DOCUMENTS

| | | | | |
|---|---|---|---|---|
| 4,963,829 A | * | 10/1990 | Wereb ................ | G01D 5/2412 324/176 |
| 6,879,150 B2 | * | 4/2005 | Sekiya ................ | G01D 5/145 324/207.2 |
| 8,710,829 B2 | * | 4/2014 | Fukuda ............... | G01D 5/2093 324/207.25 |
| 2004/0061495 A1 | * | 4/2004 | Shimomura .......... | G01D 5/145 324/207.25 |
| 2013/0113467 A1 | | 5/2013 | Sasada | |

FOREIGN PATENT DOCUMENTS

| | | |
|---|---|---|
| JP | 2004-125401 A | 4/2004 |
| WO | 2012/002126 A1 | 1/2012 |

OTHER PUBLICATIONS

Notification of Reasons for Refusal for corresponding Japanese Application No. 2015-2435530 dated Oct. 12, 2017 and English translation.

* cited by examiner

*Primary Examiner* — Reena Aurora
(74) *Attorney, Agent, or Firm* — Pearne & Gordon LLP

(57) ABSTRACT

An angle detecting apparatus using a resolver disposed at a position where an external magnetic field is present on one side in an axial direction includes a rotor that is rotatable and made of a magnetic material, a magnetic permeability of the magnet material having an uniaxial anisotropy as an entirety, and a stator disposed to face the rotor, the stator including an exciting coil and a detection coil for detecting a magnetic flux generated by the exciting coil, the rotor being provided between the stator and the external magnetic field.

6 Claims, 6 Drawing Sheets

ANGLE DETECTING APPARATUS AND ANGLE DETECTING SYSTEM

CROSS REFERENCE TO RELATED APPLICATIONS

This application claims the benefit of Japanese Patent Application No. 2015-243553, filed Dec. 14, 2015, which is hereby incorporated by reference in its entirety.

BACKGROUND

Technical Field

The present disclosure relates to an angle detecting apparatus and an angle detecting system using a resolver.

Background

As an angle detecting apparatus capable of detecting an angle with high sensitivity, which can be manufactured through a very simple assembly process without requiring complicated processing, an angle detecting apparatus is known, which includes: a rotor formed of a disk member made of a magnetic material having a uniaxial magnetic anisotropy, the disk member being rotatable around a central point in a plane of the disk member; a stator which has substantially the same outer shape as that of the disk member of the rotor and is provided to face the surface of the disk member of the rotor, the stator being divided into a plurality of fan-shaped parts, an exciting coil or a detection coil being wound around along an outer periphery of each divided part; and a back yoke which has substantially the same outer shape as that of the disk member of the stator and is provided to face the disk member of the stator, the back yoke being provided on a side opposite to a side where the rotor is provided with the stator interposed therebetween (see for example WO 2012/002126 A1).

Figure 1A:
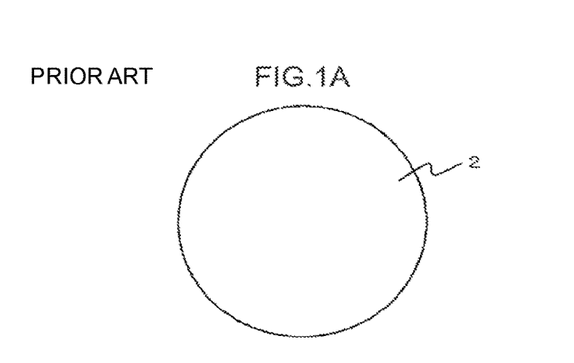
FIG. 1A is a view showing an angle detecting apparatus of the related art.
Figure 1B:
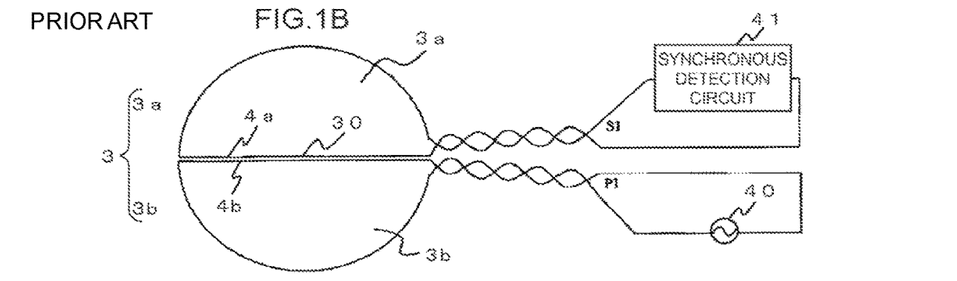
FIG. 1B is a view showing an angle detecting apparatus of the related art.
Figure 1C:
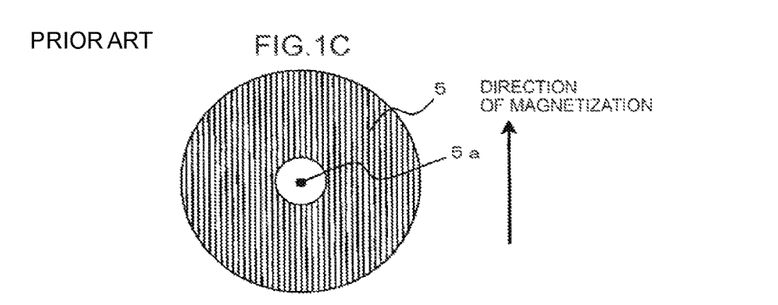
FIG. 1C is a view showing an angle detecting apparatus of the related art.

FIGS. 1A to 1C show an angle detecting apparatus in accordance with WO 2012/002126 A1 including: a rotor 5 composed of a disk member having a uniaxial magnetic anisotropy, the rotor 5 being rotatable in a plane of a disk member around a central point 5a to which a rotation shaft 6 is connected; a stator 3 which has substantially the same outer shape as that of the disk member of the rotor 5 and is provided to face the disk member of the rotor 5 in a noncontact manner; and a back yoke 2 which is formed of a magnetic thin plate having no orientation (isotropic) and has substantially the same outer shape as the stator 3, the back yoke 2 being provided in contact with or not in contact with the stator 3 to face the surface opposite to the surface where the rotor 5 is provided. The stator 3 is divided into semicircular regions (3a, 3b). A detection coil 4a (referred to as "S1") and an exciting coil 4b (referred to as "P1") are wound around side face parts of the regions 3a and 3b, respectively. The rotor 5 is formed of the disk member, and a magnetic plate or a magnetic composite plate having a uniaxial magnetic anisotropy in the planar direction (i.e., the direction of lines shown in FIG. 1C is joined to the rotation shaft 6 at the central point 5a thereof.

A magnetic material having a uniaxial magnetic anisotropy has an easy axis direction in which the magnetic material is easily magnetized and a hard axis direction perpendicular to the easy axis direction and in which the magnetic material is not easily magnetized. In the case of FIGS. 1A to 1C, an up-and-down direction in the figure is the easy axis direction and a right-and-left direction of the figure is the hard axis direction. The magnetic permeability in the easy axis direction is large, and the magnetic permeability in the hard axial direction perpendicular to the easy axis direction is a fraction to a tenth of the magnetic permeability of the easy axis direction, and becomes approximately the same as the magnetic permeability in a vacuum when the magnetic permeability is even smaller.

In this configuration, as the rotor 5 rotates, the easy axis direction of the magnetic anisotropy changes accordingly. A rotation angle can be detected by utilizing this change in the easy axis direction of the magnetic anisotropy. Hereinafter, a principle of detecting the rotation angle will be described.

First, the exciting coil 4b is connected to an alternating-current source 40, and an alternating current is fed to the exciting coil 4b. The alternating current fed to the exciting coil 4b generates a magnetic field in a direction perpendicular to the planar direction when an entire region 3b of the stator 3 is considered on average. In the vicinity of the copper wire of the coil, particularly at a part immediately under the copper wire of the coil, the magnetic field is generated in a direction parallel to the plane and perpendicularly to the copper wire of the coil. An intensity of the magnetic field is much higher than an intensity of the magnetic field at other positions (e.g., the magnetic field at a middle part of the region 3b). That is, a strong magnetic field is generated in a region 30 where the detection coil 4a and the exciting coil 4b are adjacent to each other. By the magnetic field excited by the exciting coil 4b, a voltage corresponding to the magnetic field is generated in the detection coil 4a and a synchronous detection circuit 41 connected to the detection coil 4a detects this voltage.

Here, as the rotor 5 rotates, the above-described easy axis direction changes. An induced voltage is generated in the detection coil 4a by the magnetic force generated by the exciting coil 4b, and since the magnetic field generated by the exciting coil 4b is affected in the easy axis direction of the rotor 5, the voltage induced in the detection coil 4a is affected in the easy axis direction of the rotor 5. That is, the voltage generated in the detection coil 4a changes depending on an angular position of the rotor 5. Using this principle, an angular position (a rotation angle from the reference angle position) of the rotor 5 can be determined from the voltage generated in the detection coil 4a.

Figure 2:
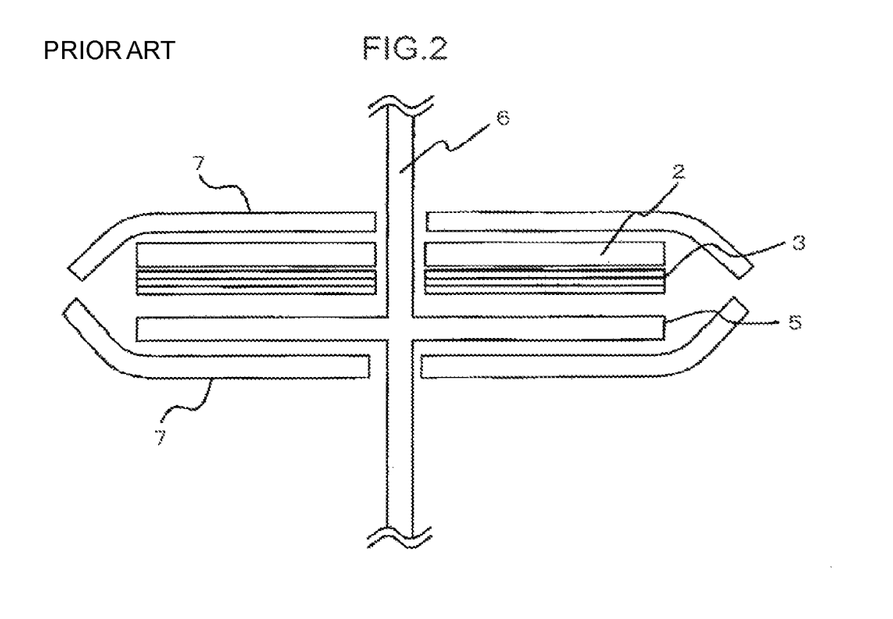
FIG. 2 is a view showing a configuration of the angle detecting apparatus of the related art provided with a shield for blocking an external magnetic field.

As shown in FIG. 2, the structure of the related art is provided with a shield 7 for shielding an external magnetic field. In order to shield an external magnetic field from at least a radial direction and also shield an external magnetic field from a direction (axial direction) perpendicular to the radial direction, the shield 7 is provided such that an outer edge part is bent to embrace all of the rotor 5, the stator 3 and the back yoke 2.

The back yoke 2 which is formed of an isotropic magnetic thin plate and has substantially the same outer shape as that of the stator 3 is provided in contact with or not in contact with the stator 3 to face the surface opposite to the surface where the rotor 5 is provided. It is not always necessary to provide the back yoke 2, but the back yoke 2 is preferably provided to strengthen magnetic flux coupling.

Here, the back yoke 2 is composed of an isotropic magnetic thin plate, and distortion, a crystal orientation in the thin plate, and the like may cause magnetic anisotropy, which impairs isotropy, and may cause a variation in magnetic permeability. Thus, an output excited by the detection coil is affected and an accuracy of angular detection is decreased. For this reason, the back yoke 2 is not provided in some configurations.

Figure 3:
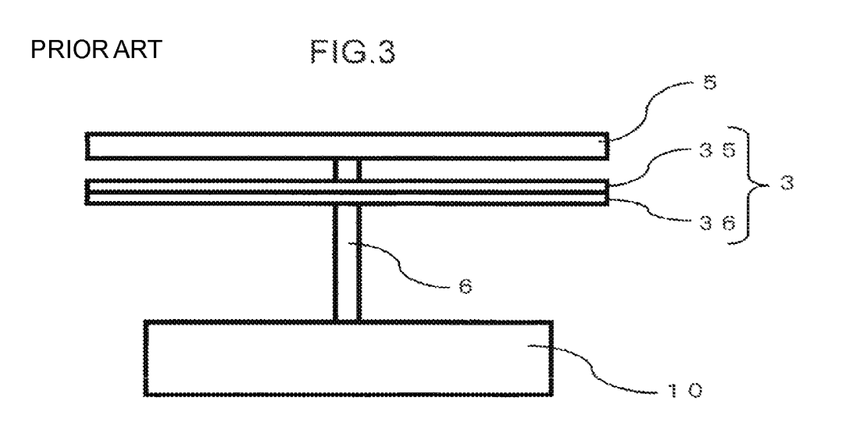
FIG. 3 is a view showing a configuration of the angle detecting apparatus of the conventional art which is not provided with a back yoke.

FIG. 3 shows one example of a configuration in which the back yoke is not provided. In FIG. 3, the rotor 5 is composed of a disk of a grain-oriented silicon steel sheet having a uniaxial anisotropy. The stator 3 includes two stators 35 and 36. The stator 35 includes an exciting coil and a detection coil for one phase, and the stator 36 is a coil having the same shape as that of the stator 35. These stators are laminated after being rotated over a predetermined angle. Moreover, a motor 10 including the rotation shaft 6 for rotating the rotor 5 is provided on the side of the stator 3.

In this configuration, there is a case in which the stator 3 is affected by an external magnetic field due to a leakage flux from the motor 10, thereby adversely affecting the accuracy of angular detection. Further essentially, in this configuration, although the bottom surface of the rotor is used in measuring the angle, a leakage magnetic field from the motor affects the bottom surface of the rotor and may disturb the magnetization state. In order to block an external magnetic field, a structure in which a magnetic shield is disposed is effective. However, with the structure shown in FIG. 2 in which the shield embracing the stator and the rotor is provided, the angle detecting apparatus is upsized and cannot be thinned, and the increased number of parts increases costs.

The present disclosure is related to providing an angle detecting apparatus and an angle detecting system having a simple configuration without impairing reduction in thickness and using a resolver capable of reducing the effect of an external magnetic field.

SUMMARY

According to a first aspect of the present disclosure, an angle detecting apparatus using a resolver disposed at a position where an external magnetic field is present on one side in an axial direction includes a rotor that is rotatable and made of a magnetic material, a magnetic permeability of the magnet material having an uniaxial anisotropy as an entirety, and a stator disposed to face the rotor, the stator including an exciting coil and a detection coil for detecting a magnetic flux generated by the exciting coil, the rotor being provided between the stator and the external magnetic field.

The above configuration is preferable in the case of a structure in which a back yoke is not disposed on a side opposite in the axial direction to a side where the rotor is disposed with respect to the stator.

In the above configuration, a structure in which a shape of the rotor is larger than a shape of the stator when viewed in the axial direction is preferable.

In the above configuration, a structure in which an outer edge of the rotor includes an extended part bent or curved toward the stator is preferable.

In the above configuration, a structure in which the extended part extends up to such a position that the extended part partially or entirely overlaps with the stator when viewed in a direction perpendicular to an axis is preferable.

In the above configuration, the external magnetic field is a motor for rotating the rotor.

According to a second aspect of the present disclosure, an angle detecting system includes an angle detecting apparatus including a motor, a rotor made of a magnetic material, a magnetic permeability of the magnetic material having an uniaxial anisotropy as an entirety, the rotor being rotatable by being driven by the motor, and a stator disposed to face the rotor, the stator including an exciting coil and a detection coil for detecting a magnetic flux generated by the exciting coil, the motor, the rotor and the stator being sequentially disposed along an axial direction, an AC source connected to the exciting coil, and a synchronous detection circuit connected to the detection coil.

The present disclosure makes it possible to obtain an angle detecting apparatus and an angle detecting system which have a simple configuration not preventing reduction in thickness and use a resolver capable of reducing the effect of an external magnetic field.

DETAILED DESCRIPTION

Embodiments

Configuration

Further features of the present disclosure will become apparent from the following detailed description of exemplary embodiments with reference to the accompanying drawings.

Figure 4:
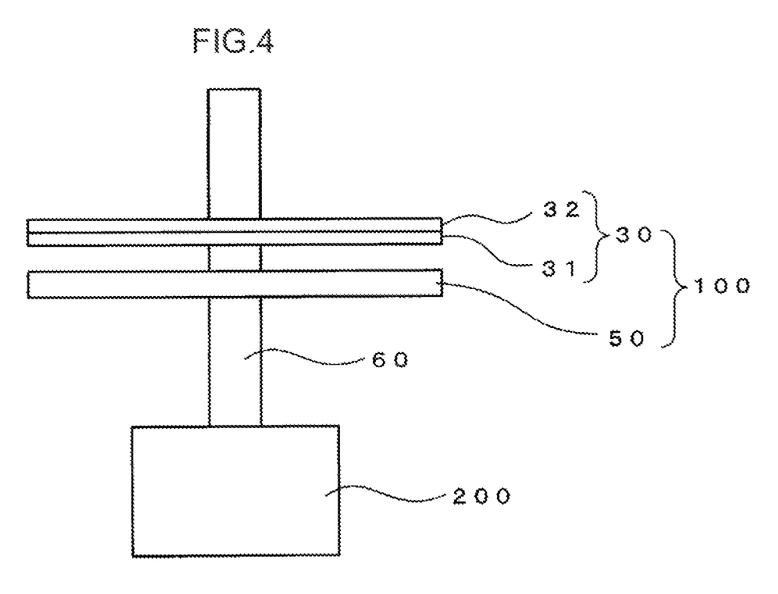
FIG. 4 is a view showing a first embodiment of the present disclosure.

FIG. 4 shows a resolver 100 in accordance with a first embodiment of the present disclosure. The resolver 100 is an axial resolver and detects angular information of a shaft (rotating shaft) 60 of a motor 200. The resolver 100 includes a stator 30 and a rotor 50. The stator 30 is fixed to a housing, not shown, of the resolver 100. When viewed from an axial direction (a direction along which the shaft 60 extends), the stator 30 has a substantially circular disk shape. At the center of the stator 30, an opening through which the shaft 60 penetrates in a rotatable manner is provided.

Figure 5:
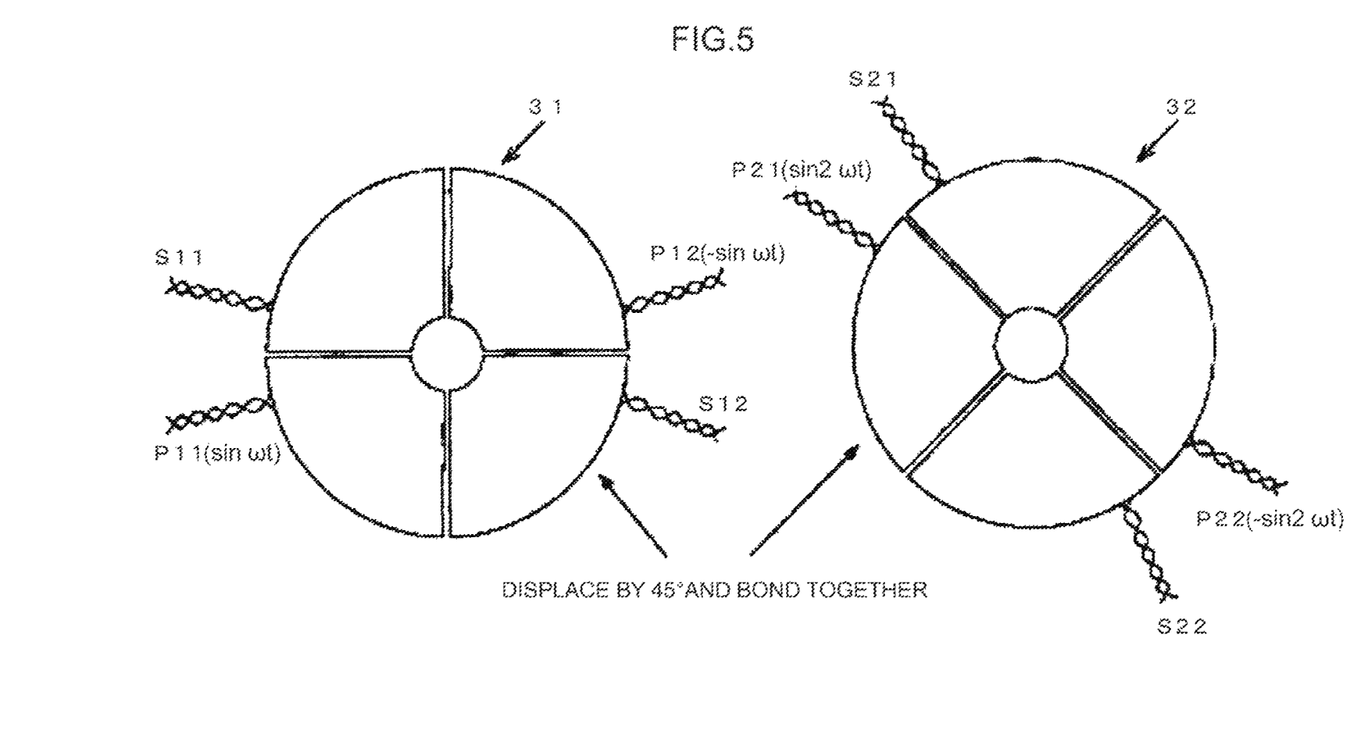
FIG. 5 is a view showing a first stator and a second stator constituting a stator when viewed from an axial direction.

FIG. 5 shows a state in which a first stator 31 and a second stator 32 constituting the stator 30 are viewed from the axial direction. The first stator 31 and the second stator 32 are identical and laminated such that the first stator 31 and the second stator 32 are angularly displaced by 45°. Since the first stator 31 and the second stator 32 are identical, only the first stator 31 will be described here. The first stator 31 includes a circular PCB substrate as a base and four coils at an outer edge of the PCB substrate. The four coils have the same shape and are composed of a printed wire. Each coil has a substantially fan shape with an angle at the center being 90°. In detail, each coil includes: an inner quarter-circumferential part on a side closer to a center of the shaft; an outer quarter-circumferential part on a side remote from the center of the shaft; and two linear parts extending in a radial direction to connect end parts of the inner quarter-circumferential part and the outer quarter-circumferential part. The four coils are exciting coils P11 and P12 and detection coils S11 and S12.

Similar to the first stator 31, the second stator 32 includes exciting coils P21 and P22 and detection coils S21 and S22. At a central circular part of the four coils, an opening is formed in the PCB substrate, and the shaft 60 penetrates through the opening in a rotatable manner.

In this example, an exciting current of, for example, sin ωt is input to a system of P1 (P11, P12), and an exciting current of, for example, sin 2 ωt is input to a system of P2 (P21, P22). At this time, synchronous detection is performed so as to prevent interference of sin ωt of the P1 system and sin 2 ωt of the P2 system. The frequency f2 of the P2 system is two times higher than the frequency f1 of the P1 system. Angular information of the rotor 30 can be obtained from detection signals from the detection coils S11, S12, S21 and S22. The details of this technology are described in WO2012/002126 A1.

The rotor 50 has a disk shape similar to that of the stator 30 and is coaxial with the stator 30. The rotor 50 is disposed with a gap between the rotor and the stator 30. The rotor 50 rotates together with the shaft 60 that is fixed to the rotor 50 in such a manner that the shaft 60 that is a driving shaft of the motor 200 penetrates through the center of the rotor 50. The rotor 50 is composed of a disk of a grain-oriented silicon steel sheet, the magnetic permeability of which has a uni-axial anisotropy as an entirety.

The motor 200 is one example of an external magnetic field. Examples of the motor 200 include a DC motor, but the type of the motor 200 is not particularly limited. An induction motor, a stepping motor and the like can be selected depending on usage. In addition to the motor, a permanent magnet or a device using an electromagnet (e.g., another resolver which is coaxially arranged or an electromagnetic clutch) may be the external magnetic field.

Function

As the motor 200 rotates, the rotor 50 fixed to the shaft 60 rotates. As the rotor 50 rotates, a magnetic field generated by the exciting coils of the first stator 31 and the second stator 32 depending on the rotation angle of the rotor 50 having an in-plane anisotropy is modulated. This affects voltages induced in the detection coils of the first stator 31 and the second stator 32. That is, the voltages induced in the detection coils of the first stator 31 and the second stator 32 are modulated depending on the rotation angle of the rotor 50. Specifically, detection signals of the detection coils S11, S12, S21 and S22 are periodic signals including angular information of the rotor 50, and the rotation angle of the rotor 50 can be obtained by processing the detection signals of the detection coils S11, S12, S21 and S22.

Advantage

The resolver 100 does not include a back yoke of the stator 30, and the side of the stator 30 opposite to the side where the rotor 50 is disposed (the upper side in FIG. 4) is magnetically exposed. In other words, the side of the stator 30 opposite the side where the rotor 50 is disposed (the upper side in FIG. 4) is not magnetically shielded. When a back yoke is provided, a magnetic flux density of the magnetic field generated by the exciting coils increases, and thus the levels (voltage values) of the detection signals detected by the detection coils can be increased. However, when angle detection is carried out with higher accuracy, a subtle maldistribution of magnetic properties (local difference in magnetic permeability or anisotropy) of the back yoke itself adversely affects the detection accuracy. Here, the problem that the levels of the detection signals are low can be handled by contrivances such as amplification by means of a low-noise amplifier and noise reduction at an input part of an RD converter. Thus, in a case where the accuracy of angle detection has priority, the configuration of the resolver 100, which does not include a back yoke, is useful.

When the effect of the back yoke is eliminated, a leakage flux from the motor 200 constitutes a factor of exerting a large influence on the accuracy of angular detection. As to the resolver 100, the rotor 50 is provided between the stator 30 and the motor 200, and the rotor 50 composed of the grain-oriented silicon steel sheet functions as a magnetic shield. Actually, even if the thickness of the grain-oriented silicon steel sheet is approximately 300 micron meters, with the frequency of the excited magnetic field being several kilohertz to several hundreds of kilohertz, a skin depth, which is a depth at which an excited magnetic flux can penetrate in the grain-oriented silicon steel sheet, ($\sqrt{(2/(2\pi f\sigma\mu)}$, where f: exciting frequency, σ: conductivity of the silicon steel plate (approximately 2,000,000 S/m), μ: magnetic permeability of the silicon steel plate (approximately 0.006 H/m)) is as small as 10-70 micron meters. If the remaining part having a thickness of approximately 230 micron meters can shield the external magnetic field, the effect of the magnetic field due to the motor and the like can be eliminated. This structure can shield the external magnetic field due to the motor 200 without separately providing a shield plate. Thus, it is possible to suppress the effect of the leakage flux from the motor 200 on the detection coils of the stator 30 and to obtain a favorable output waveform of a two-phase sine wave. That is, the resolver 100 can be thinned without increasing the number of parts and can detect the angle with high accuracy.

Other Structures

Figure 6:
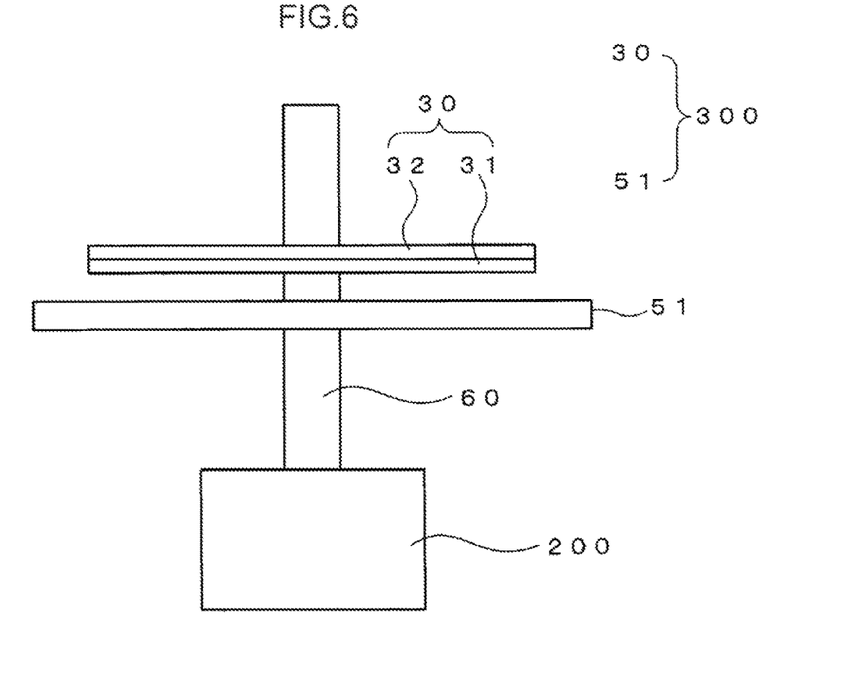
FIG. 6 is a view showing a second embodiment of the present disclosure.

FIG. 6 shows a resolver 300 in accordance with a second embodiment of the present disclosure. The resolver 300 is an example in which an outer diameter of a disk-shaped rotor 51 is larger than the outer diameter of the disk-shaped stator 30 in the resolver 100 shown in FIG. 4. With this structure, the magnetic flux leaking from the motor 200 and reaching the stator 30 can be shielded more efficiently.

Figure 7:
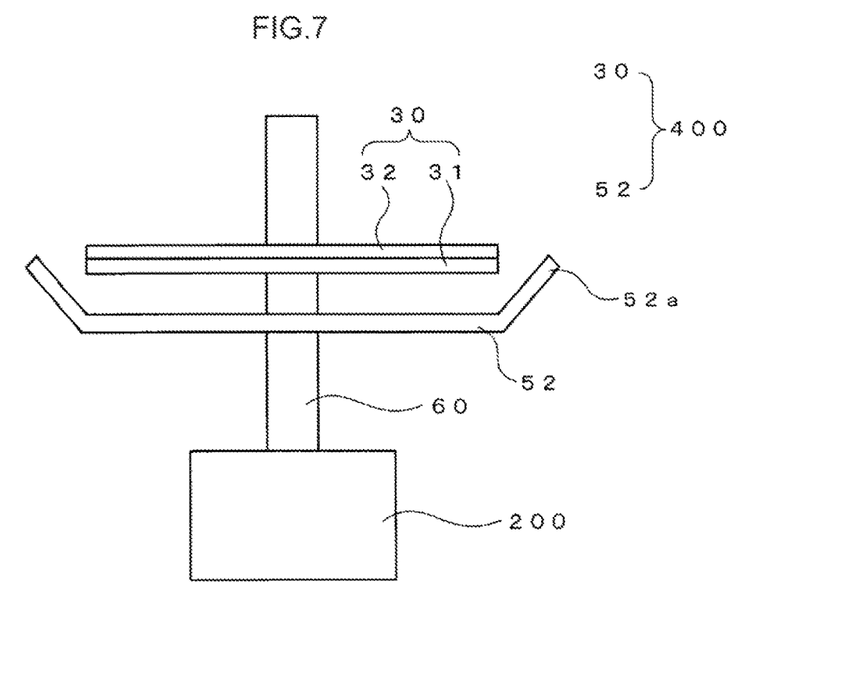
FIG. 7 is a view showing a third embodiment of the present disclosure.

FIG. 7 shows a resolver 400 in accordance with a third embodiment of the present disclosure. The resolver 400 is an example in which there is provided an extended part 52a formed by bending an outer edge part of the disk-shaped rotor 52 toward the stator 30. The extended part 52a includes a component extending toward the stator 30. Moreover, when viewed from the direction perpendicular to the axis, the extended part 52a partially overlaps with the stator 30. The overlapping part may be enlarged such that the stator 30 is hidden by the extended part 52a when viewed from the direction perpendicular to the axis. In the structure shown in FIG. 7, a concave part is formed inward of the extended part 52a, and the stator 30 is partially housed in the concave part, thereby suppressing a magnetic flux entering from the side of the stator 30.

Figure 8:
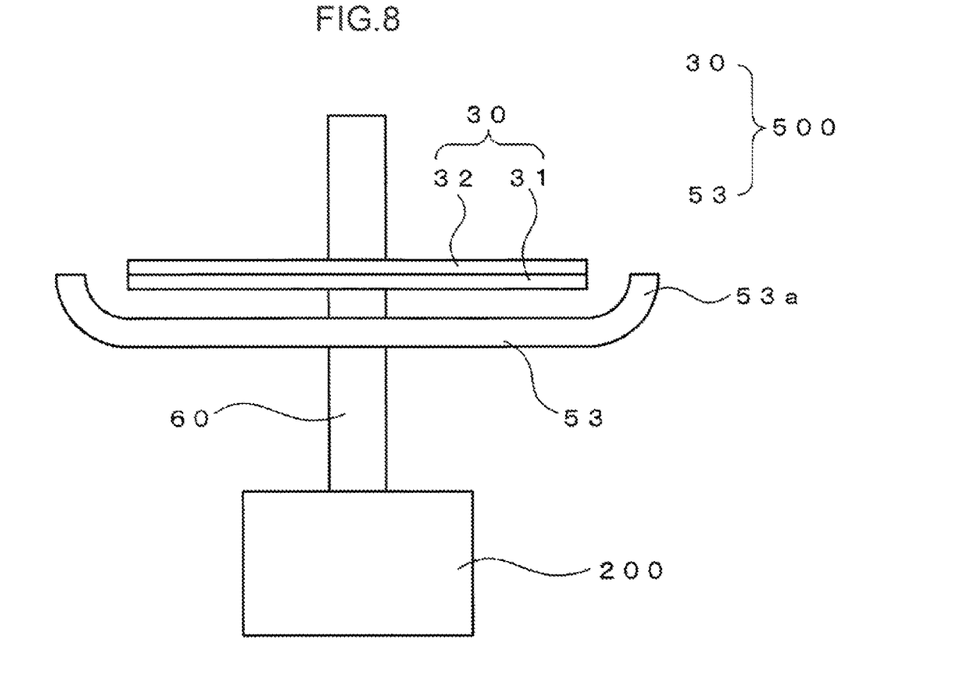
FIG. 8 is a view showing a fourth embodiment of the present disclosure.

FIG. 8 shows a resolver 500 in accordance with a fourth embodiment of the present disclosure. The resolver 500 is an example in which an extended part 53a curved toward the stator 30 is provided at an outer edge part of the disk-shaped rotor 53. In this case, a concave part is formed inward of the extended part 53a, and the stator 30 is partially housed in the concave part, thereby suppressing a magnetic flux entering from the side of the stator 30.

Figure 9:
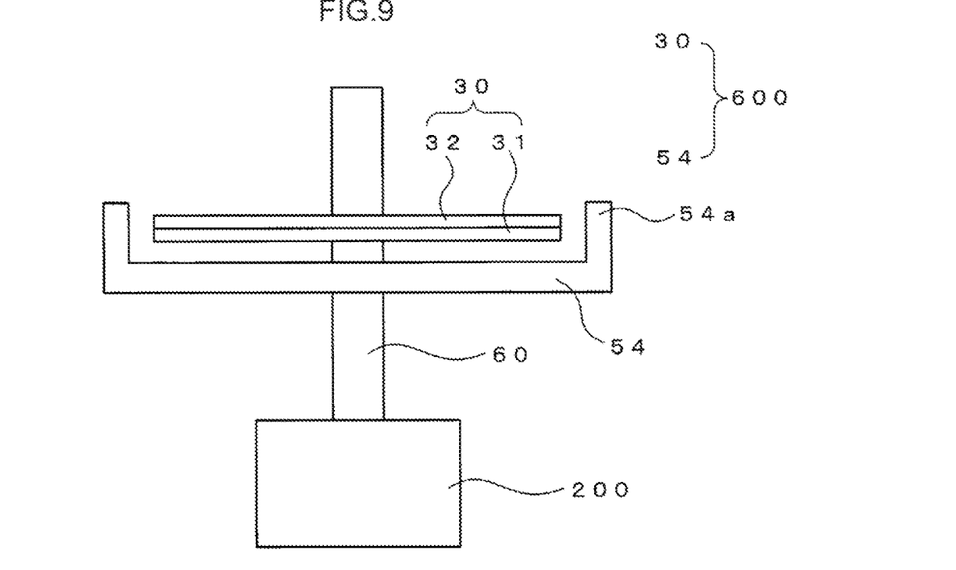
FIG. 9 is a view showing a fifth embodiment of the present disclosure.

FIG. 9 shows a resolver 600 in accordance with a fifth embodiment of the present disclosure. The resolver 600 is provided with an extended part 54a formed by perpendicularly bending an outer edge part of the disk-shaped rotor 54 toward the stator 30. In this case, a concave part is formed inward of the extended part 54a, and the stator 30 is housed in the concave part, thereby suppressing a magnetic flux entering from the side of the stator 30.

Although the extended parts 52a and 53a are provided at such positions that the extended parts do not overlap with the stator 30 when viewed from the axial direction, the extended parts 52a and 53a may be structured to partially overlap with the edge portion of the stator 30 when viewed from the axial direction. Moreover, the extended parts 52a, 53a and 54a may be structured to partially overlap with the stator 30 when viewed from the direction perpendicular to the axis, or the extended parts 52a, 53a and 54a may be structured to entirely overlap with the stator 30 so that the stator 30 is completely hidden by the extended parts 52a, 53a and 54a when viewed from the direction perpendicular to the axis.

The exciting coils are connected to an AC source as shown in FIGS. 1A to 1C, and an alternating current is fed to the above-described resolvers 100, 300, 400, 500 and 600. A system is constituted which generates voltages in the detection coils depending on a magnetic field excited by the exciting coils by supplying an alternating current to the exciting coils, and detects the voltages by means of the synchronous detection circuit connected to the detection coils.

What is claimed is:

1. An angle detecting apparatus using a resolver disposed at a position where an external magnetic field is present on one side in an axial direction, the angle detecting apparatus comprising:
    a rotor that is rotatable and made of a magnetic material, a magnetic permeability of the magnet material having an uniaxial anisotropy as an entirety; and
    a stator disposed to face the rotor, the stator including an exciting coil and a detection coil for detecting a magnetic flux generated by the exciting coil, the rotor being provided between the stator and the external magnetic field in the axial direction,
    wherein an outer diameter of the rotor is larger than an outer diameter of the stator when viewed from the axial direction.

2. The angle detecting apparatus in accordance with claim 1, wherein
    a back yoke is not disposed on a side opposite in the axial direction to a side where the rotor is disposed with respect to the stator.

3. The angle detecting apparatus in accordance with claim 1, wherein
    an outer edge of the rotor includes an extended part bent or curved toward the stator.

4. The angle detecting apparatus in accordance with claim 3,
    wherein the extended part extends up to such a position that the extended part partially or entirely overlaps with the stator when viewed in a direction perpendicular to an axis.

5. The angle detecting apparatus in accordance with claim 1, wherein the external magnetic field is a motor for rotating the rotor.

6. An angle detecting system comprising:
    an angle detecting apparatus including:
    a motor;
    a rotor made of a magnetic material, a magnetic permeability of the magnetic material having an uniaxial anisotropy as an entirety, the rotor being rotatable by being driven by the motor; and
    a stator disposed to face the rotor, the stator including an exciting coil and a detection coil for detecting a magnetic flux generated by the exciting coil, the motor, the rotor and the stator being sequentially disposed along an axial direction, wherein an outer diameter of the rotor is larger than an outer diameter of the stator when viewed from the axial direction;
    an AC source connected to the exciting coil; and
    a synchronous detection circuit connected to the detection coil.

* * * * *

UNITED STATES PATENT AND TRADEMARK OFFICE
CERTIFICATE OF CORRECTION

PATENT NO. : 10,082,407 B2
APPLICATION NO. : 15/378599
DATED : September 25, 2018
INVENTOR(S) : Takaaki Ochiai et al.

It is certified that error appears in the above-identified patent and that said Letters Patent is hereby corrected as shown below:

On the Title Page

Item (73) Assignee: "MINEBEA MITSUMI INC., Nagano, Japan (JP)" should read -- MINEBEA MITSUMI INC., Nagano, Japan (JP); KYUSHU UNIVERSITY, NATIONAL UNIVERSITY CORPORATION, Fukuoka, Japan (JP) --

Signed and Sealed this
Twelfth Day of February, 2019

Andrei Iancu
*Director of the United States Patent and Trademark Office*